(12) United States Patent
You et al.

(10) Patent No.: US 10,782,557 B2
(45) Date of Patent: Sep. 22, 2020

(54) ADJUSTABLE REFLECTIVE DEVICE, BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yang You, Beijing (CN); Yun Qiu, Beijing (CN); Ruizhi Yang, Beijing (CN); Zhenhua Lv, Beijing (CN); Ruiyong Wang, Beijing (CN); Yonglian Qi, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/140,391

(22) Filed: Sep. 24, 2018

(65) Prior Publication Data

US 2019/0094611 A1     Mar. 28, 2019

(30) Foreign Application Priority Data

Sep. 25, 2017   (CN) .......................... 2017 1 0875791

(51) Int. Cl.
  *G02F 1/1335*   (2006.01)
  *G02F 1/13357*  (2006.01)
  (Continued)

(52) U.S. Cl.
  CPC ...... *G02F 1/133553* (2013.01); *G02F 1/1343* (2013.01); *G02F 1/133602* (2013.01); *G02F 1/133605* (2013.01); *G09G 3/2003* (2013.01); *G02F 2202/32* (2013.01); *G09G 2300/023* (2013.01)

(58) Field of Classification Search
  CPC ......... G02F 1/133553; G02F 1/133604; G02F 2202/32
  See application file for complete search history.

(56) References Cited

U.S. PATENT DOCUMENTS

2010/0103337 A1* 4/2010 Takaku ................. C09K 19/36
                                                                                                   349/33
2010/0265566 A1* 10/2010 Han ................. G02F 1/133615
                                                                                                   359/296
(Continued)

FOREIGN PATENT DOCUMENTS

CN        101440916 A        5/2009
CN        101878393 A       11/2010
(Continued)

OTHER PUBLICATIONS

First Office Action issued in corresponding Chinese Application No. 201710875791.6, dated Dec. 23, 2019, with English translation.

*Primary Examiner* — Jessica M Merlin
(74) *Attorney, Agent, or Firm* — McDermott Will & Emery LLP (57) ABSTRACT

An adjustable reflective device includes a base substrate, a reflective film disposed above the base substrate, and an adjustment assembly configured to control reflectivities of different portions of the reflective film.

14 Claims, 6 Drawing Sheets

(51) Int. Cl.
*G09G 3/20* (2006.01)
*G02F 1/1343* (2006.01)

(56) References Cited

U.S. PATENT DOCUMENTS

| | | |
|---|---|---|
| 2010/0302226 A1 | 12/2010 | Oka |
| 2016/0349430 A1 | 12/2016 | Li et al. |
| 2018/0081109 A1 | 3/2018 | Xu |

FOREIGN PATENT DOCUMENTS

| | | | | |
|---|---|---|---|---|
| CN | 103943071 A | * | 2/2014 | |
| CN | 103943071 A | | 7/2014 | |
| CN | 104834052 A | | 8/2015 | |
| CN | 104965386 A | | 10/2015 | |
| CN | 105757533 A | | 7/2016 | |
| CN | 106646682 A | | 5/2017 | |

* cited by examiner

ADJUSTABLE REFLECTIVE DEVICE, BACKLIGHT MODULE AND DISPLAY DEVICE

CROSS-REFERENCE TO RELATED APPLICATION

This application claims priority to Chinese Patent Application No. 201710875791.6, filed on Sep. 25, 2017, titled "AN ADJUSTABLE REFLECTIVE DEVICE, BACKLIGHT MODULE AND DISPLAY DEVICE", which is incorporated herein by reference in its entirety.

TECHNICAL FIELD

The present disclosure relates to the field of display technologies, and more particularly, to an adjustable reflective device, a backlight module and a display device.

BACKGROUND

A liquid crystal display (LCD) is a flat and ultra-thin display device, which uses a backlight module to provide backlight to a display panel, so that the display panel can display pictures.

SUMMARY

In a first aspect, some embodiments of the present disclosure provide an adjustable reflective device. The adjustable reflective device includes a base substrate, a reflective film disposed above the base substrate, and an adjustment assembly configured to control reflectivities of different portions of the reflective film.

In some embodiments, the base substrate is a black base substrate.

In some embodiments, the reflective film includes at least two photonic crystal layers, and each photonic crystal layer is stacked with the base substrate. The adjustment assembly includes at least two electric driving modules that are in one-to-one correspondence with the at least two photonic crystal layers, and each electric driving module is configured to provide drive voltages to a corresponding photonic crystal layer of the at least two photonic crystal layers, so that reflectivities of different portions of the corresponding photonic crystal layer are adjustable under the drive voltages. The at least two photonic crystal layers are configured to allow light to pass through in an uncontrolled state, the photonic crystal layers are configured to reflect light of different colors in a controlled state, and light obtained after mixing light reflected by the at least two photonic crystal layers in the controlled state is white light.

In some embodiments, the at least two photonic crystal layers includes a first photonic crystal layer, a second photonic crystal layer, and a third photonic crystal layer respectively. The first photonic crystal layer is configured to reflect light of a first primary color in a controlled state, the second photonic crystal layer is configured to reflect light of a second primary color in a controlled state, and the third photonic crystal layer is configured to reflect light of a third primary color in a controlled state.

In some embodiments, the light of the first primary color is red light, the light of the second primary color is green light, and the light of the third primary color is blue light. Alternatively, the light of the first primary color is cyan light, the light of the second primary color is magenta light, and the light of the third primary color is yellow light.

In some embodiments, a plurality of through holes is provided in each of portions of each photonic crystal layer, the photonic crystal layer includes a plurality of charged media in each of the plurality of through holes, and each of charges carried by the charged media has an opposite polarity with the drive voltage.

In some embodiments, a thickness of each of the at least two photonic crystal layers ranges from 4 $\mu$m to 6 $\mu$m.

In some embodiments, each electric driving module includes a plurality of light-transmissive electrode pairs, and each light-transmissive electrode pair includes a first light-transmissive electrode and a second light-transmissive electrode. One of the at least two photonic crystal layer is disposed between first light-transmissive electrodes and second light-transmissive electrodes in light-transmissive electrode pairs of a corresponding electric driving module.

In some embodiments, in two adjacent photonic crystal layers of the reflective film, first light-transmissive electrodes in an electric driving module corresponding to a photonic crystal layer disposed away from the base substrate serves as second light-transmissive electrodes in an electric driving module corresponding to a photonic crystal layer disposed close to the base substrate.

In some embodiments, the adjustable reflective device further includes at least one interlayer insulating layer each of which is disposed between first light-transmissive electrodes in an electric driving module corresponding to a photonic crystal layer, which is disposed away from the base substrate, in two adjacent photonic crystal layers of the reflective film, and second light-transmissive electrodes in an electric driving module corresponding to a photonic crystal layer, which is disposed close to the base substrate, in the two adjacent photonic crystal layers.

In some embodiments, the plurality of light-transmissive electrode pairs are arranged in a pixelated manner.

In some embodiments, orthographic projections of a first light-transmissive electrode and a second light-transmissive electrode in each of the plurality of light-transmissive electrode pairs on the base substrate coincide with each other. Alternatively, orthographic projections of the first light-transmissive electrode and the second light-transmissive electrode in each of the plurality of light-transmissive electrode pairs on the base substrate have an overlapping region.

In a second aspect, some embodiments of the present disclosure provide a backlight module, and the backlight module includes the adjustable reflective device provided in any of the above embodiments.

In a third aspect, some embodiments of the present disclosure provide a display device, and the display device includes the backlight module provided in the embodiments described above.

In some embodiments, the adjustable reflective device of the backlight module is the adjustable reflective device described above, and the display device further includes at least two voltage adjusting units that are in one-to-one correspondence with the at least two electric driving modules. Each voltage adjusting unit includes a plurality of voltage regulators that are in one-to-one correspondence with the plurality of light-transmissive electrode pairs, and each voltage regulator is connected to a corresponding light-transmissive electrode pair.

In some embodiments, the display device further includes a display panel, and a display region of the display panel includes a plurality of sub-pixels. Orthographic projections of a first light-transmissive electrode and a second light-transmissive electrode in each of the plurality of light-transmissive electrode pairs on the base substrate overlap, and light-transmissive regions of the plurality of sub-pixels are in one-to-one correspondence with the plurality of light-transmissive electrode pairs. An orthographic projection of a light-transmissive region of each of the plurality sub-pixels on the base substrate coincides with an orthographic projection of a first light-transmissive electrode included in a corresponding light-transmissive electrode pair on the base substrate. Alternatively, orthographic projections of the first light-transmissive electrode and the second light-transmissive electrode in each of the light-transmissive electrode pairs on the base substrate have an overlapping region, and light-transmissive regions of the plurality of sub-pixels are in one-to-one correspondence with the plurality of light-transmissive electrode pairs. An orthographic projection of a light-transmissive region of each of the sub-pixels on the base substrate coincides with an overlapping region between orthographic projections of a first light-transmissive electrode and a second light-transmissive electrode in a corresponding light-transmissive electrode pair on the base substrate.

BRIEF DESCRIPTION OF THE DRAWINGS

The accompanying drawings are used to provide further understanding of the disclosure and constitute a part of the disclosure. The exemplary embodiments of the present disclosure and the description thereof serve to explain the disclosure, but do not constitute a limitation to the disclosure. In the accompanying drawings.

DETAILED DESCRIPTION

Technical solutions in embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
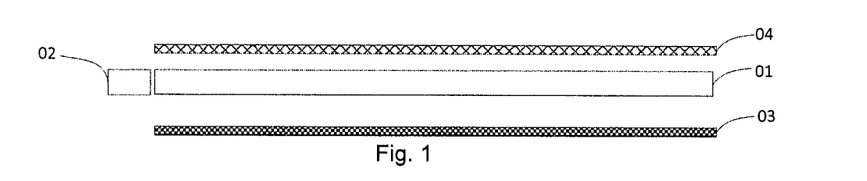
FIG. 1 is a structural diagram of a side-type backlight module in the related art.

There are many kinds of backlight modules in the display devices, such as direct-type or side-type backlight modules. For the direct-type backlight module, it is generally adjusted dynamically through zoning control of light sources of the direct-type backlight module, so that the contrast of the picture displayed by the display panel is relatively high after the direct-type backlight module provides backlight to the display panel. For the side-type backlight module, as shown in FIG. 1, it includes a light guide plate 01 and a light source 02 disposed on a side of the light guide plate 01. A bottom of the light guide plate 01 is provided with a planar reflector sheet 03 for totally reflecting light provided to the light guide plate 01 by the light source 02, to ensure that the light is totally emitted to the display panel 04 from an upper surface of the light guide plate 01. However, this may make the light provided by the side-type backlight module unable to be dynamically adjusted, resulting in a relatively low contrast of the picture displayed by the display panel.

Figure 12:
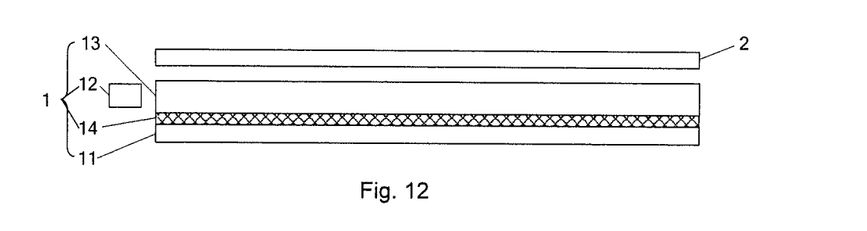
FIG. 12 is a schematic structural diagram of a display device according to some embodiments of the present disclosure.

In order to achieve the dynamic adjustment of the side-type backlight module, as shown in FIG. 12, some embodiments of the present disclosure provide a display device, and the display device includes a backlight module 1 and a display panel 2. The backlight module 1 and the display panel 2 are stacked, and the backlight module 1 is configured to provide backlight to the display panel 2.

It will be noted that, herein, orientation terms such as "left", "right", "upper" and "lower" are defined according to schematically placed orientations of the pixel arrangement structure in the drawings. It will be understood that these directional terms are relative concepts that are used for relative description and clarification, which may vary accordingly depending on variation of the orientation in which the pixel arrangement structure is placed.

In some embodiments, as shown in FIG. 12, the backlight module 1 includes an adjustable reflective device 11, a backlight source 12, and a light guide plate 13. The display panel 2 is disposed on a side of the light guide plate 13, and the adjustable reflective device 11 is disposed on an opposite side of the light guide plate 13 facing away from the display panel 2. A light emitting surface of the backlight source 12 is opposite to a sidewall of the light guide plate 13. In this way, after light emitted from the backlight source 12 enters the light guide plate 13, it is emitted from a surface of the light guide plate 13 facing away from the adjustable reflective device 11 to the display panel 2 under a reflecting action of the adjustable reflective device 11.

Figure 2:
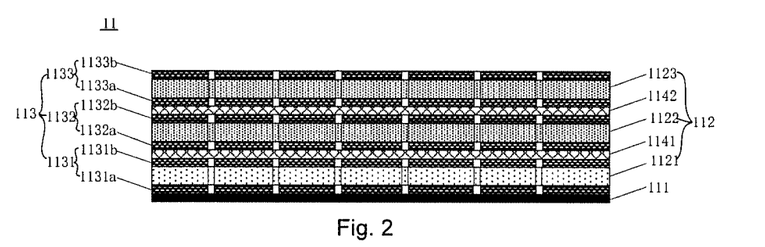
FIG. 2 is a schematic diagram of an adjustable reflective device according to some embodiments of the present disclosure.
Figure 3:
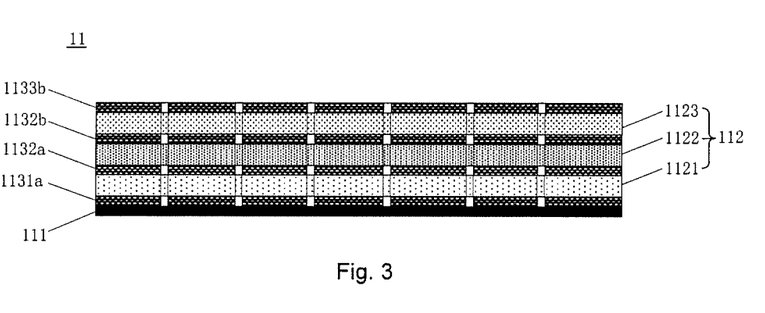
FIG. 3 is a schematic diagram of another adjustable reflective device according to some embodiments of the present disclosure.

In some embodiments, as shown in FIG. 2 or 3, the adjustable reflective device 11 includes a base substrate 111, a reflective film 112 disposed above the base substrate 111, and an adjustment assembly 113 configured to control reflectivities of different portions of the reflective film 112.

In implementation, as shown in FIGS. 2-8, since the reflective film 112 is disposed above the base substrate 111, and the adjustment assembly 113 can control reflectivities of different portions of the reflective film 112, reflectivities of different portions of the reflective film 112 may be adjusted by the adjustment assembly 113 in the case where the adjustable reflective device 11 is applied to the side-type backlight module. Therefore, when light of the same intensity emitted from the light guide plate 13 are irradiated on a surface of the reflective film 112, reflectivities of different portions of the reflective film 112 may be controlled by the adjustment assembly 113, thereby portions of the reflective film with different reflectivities reflect the light into light of different intensities, and return them to the light guide plate 13, and the light is provided to the display panel as backlight. As can be seen, the adjustable reflective device 11 enables dynamic adjustment of backlight provided by the backlight source, thereby improving the contrast and brightness level of the picture displayed by the display panel.

Assuming that the adjustment assembly 113 adjusts a reflectivity of the reflective film 112 below 100%, part of light emitted to the reflective film 112 would pass through the reflective film 112 and emits to the base substrate 111, and in the case that the base substrate 111 is transparent, the light emitted to the reflective film 112 will have some loss. In order to solve this problem, as shown in FIGS. 4-8, the base substrate is a black base substrate, thereby preventing partial light emitted to the reflective film 112 from being emitted directly from the base substrate to cause light leakage. Moreover, in the case where the adjustable reflective device 11 is applied to the backlight module, and the backlight module provides light to the display panel, if the adjustment assembly 113 adjusts a reflectivity of a portion of the reflective film 112 to 0~100%, the corresponding part in the displayed image may appear semi-black, while if the adjustment assembly 113 adjusts a reflectivity of the portion of the reflective film 112 to 0, the corresponding part in the displayed image may appear all-black. Therefore, in the adjustable reflective device 11, by defining the base substrate 111 as a black base substrate, it is possible to improve the contrast and the brightness level of the displayed image in the case where the adjustable reflective device 11 is applied to the backlight module of the display device.

It will be understood that the base substrate 111 is a black base substrate, and the black base substrate is for example a black substrate or a structure including a common glass substrate and a black film formed on the glass substrate. In addition, the above-mentioned reflectivity is pertinent to light in a frequency band of visible light, and for light in a frequency band of non-visible light, even if the reflectivity of the reflective film 112 is 0, the reflective film 112 can reflect the light.

Illustratively, as shown in FIGS. 2 and 3, in the adjustable reflective device 11, the reflective film 112 includes at least two photonic crystal layers, each of which is stacked with the base substrate 111. Each of the at least two photonic crystal layers is configured to allow light to pass through in an uncontrolled state, and each of the at least two photonic crystal layers is configured to reflect light of different colors in a controlled state. Light obtained after mixing light reflected by the at least two photonic crystal layers in a controlled state is white light.

The adjustment assembly 113 includes at least two electric driving modules that are in one-to-one correspondence with the at least two photonic crystal layers, and each electric driving module is configured to provide drive voltages to a corresponding photonic crystal layer, so that the reflectivity of the corresponding photonic crystal layer is adjustable under the applied drive voltages. As can be seen, each photonic crystal layer is equipped with an electric driving module, so that reflectivities of the at least two photonic crystal layers may be controlled separately. In addition, the electric driving module is configured to control reflectivities of different portions of the corresponding photonic crystal layer, and thus reflectivities of different portions of the corresponding photonic crystal layer may be controlled separately. Therefore, in the adjustable reflective device 11, the light emitted to the reflective layer may be adjusted finely based on regions or colors through the electric driving modules equipped for the photonic crystal layers respectively.

The controlled state refers to a state when a drive voltage provided by the electric driving module to the corresponding photonic crystal layer is not zero, and the uncontrolled state refers to a state when a drive voltage provided by the electric driving module to the corresponding photonic crystal layer is zero.

In order to improve the control accuracy of the reflectivity, as shown in FIGS. 2 and 3, in some embodiments, a plurality of through holes are provided in each of the portions of the photonic crystal layer. The photonic crystal layer includes charged media provided in each through hole, and a charge carried by each charged medium has an opposite polarity with the drive voltage, such that different amounts of charged media can be adsorbed to a wall of the through hole by adjusting a drive voltage when the electric driving module applies the drive voltage to the photonic crystal layer. On this basis, transmittance of each portion in the photonic crystal layer may be further controlled based on regions, and thereby transmittance of each portion of the photonic crystal layer may be adjusted more accurately. The charged media are for example solid particles or liquid media. Common charged media are charged colloidal particles or charged ink. The charged colloidal particles are for example one or more of aluminum hydroxide colloids, ferric hydroxide colloids, silicate colloids, starch colloids, protein colloids, etc. The charged ink is for example micro-cup ink, electronic ink, etc. The polarity of the charge carried by the charge media can be adjusted according to the polarity of drive voltage.

In some embodiments, reflectivities of different portions of the photonic crystal layer is adjusted by adjusting the magnitudes of the applied drive voltages, so as to adjust the intensities of the light reflected by different portions of each photonic crystal layer and realize local brightness adjustment.

In some embodiments, as shown in FIG. 2 or 3, a thickness of each photonic crystal layer ranges from 4 μm to 6 μm. For example, the thickness of each photonic crystal layer is 5.6 μm. Thus the adjustable reflective device 11 is very thin, and its application in a backlight module is conducive to the development of thin and light LCDs.

As for the number of the at least two photonic crystal layers, it can be set according to the actual situation. In some embodiments, as shown in FIG. 2 or 3, the at least two photonic crystal layers include three photonic crystal layers, i.e., a first photonic crystal layer 1121, a second photonic crystal layer 1122, and a third photonic crystal layer 1123 respectively. The first photonic crystal layer 1121 reflects light of a first primary color in a controlled state, the second photonic crystal layer 1122 reflects light of a second primary color in a controlled state, and the third photonic crystal layer 1123 reflects light of a third primary color in a controlled state. The light of the first, second and third primary colors are mixed into for example white light. As for the colors of the light of the first, second and third primary colors, they can be set according to the actual situation. For example, the light of the first primary color is red light, the light of the second primary color is green light, and the light of the third primary color is blue light. Alternatively, the light of the first primary color is cyan light, the light of the second primary color is magenta light, and the light of the third primary color is yellow light.

The following description explains how to achieve layered reflection control for the at least two photonic crystal layers, ignoring light control of different portions in each photonic crystal layer by taking the at least two photonic crystal layers including three photonic crystal layers as an example. The light of the first primary color is red light, the light of the second primary color is green light, and the light of the third primary color is blue light.

For convenience of description, as shown in FIGS. 4-8, the electric driving module corresponding to the first photonic crystal layer 1121 is defined as a first electric driving module V1, the electric driving module corresponding to the second photonic crystal layer 1122 is defined as a second electric driving module V2, and the electric driving module corresponding to the third photonic crystal layer 1123 is defined as a third electric driving module V3.

Figure 4:
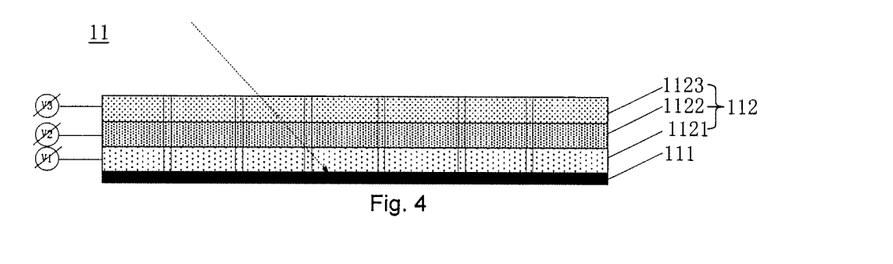
FIG. 4 is a schematic diagram illustrating reflection of a first, a second and a third photonic crystal layers in an uncontrolled state according to some embodiments of the present disclosure.

As shown in FIG. 4, if the first electric driving module V1 does not apply a drive voltage to the first photonic crystal layer 1121, the second electric driving module V2 does not apply a drive voltage to the second photonic crystal layer 1122, and the third electric driving module V3 does not apply a drive voltage to the third photonic crystal layer 1123, then the first photonic crystal layer 1121, the second photonic crystal layer 1122 and the third photonic crystal layer 1123 are all in an uncontrolled state, allow light to pass through, and do not reflect colors. At this time, reflectivities of the first photonic crystal layer 1121, the second photonic crystal layer 1122 and the third photonic crystal layer 1123 are 0, that is, these layers reflect non-visible light and transmit visible light. In other words, the color of the base substrate 111 can be seen visually through the first photonic crystal layer 1121, the second photonic crystal layer 1122 and the third photonic crystal layer 1123. For example, the base substrate 111 is a black base substrate, and the color of the base substrate 111 that is seen is black.

Figure 5:
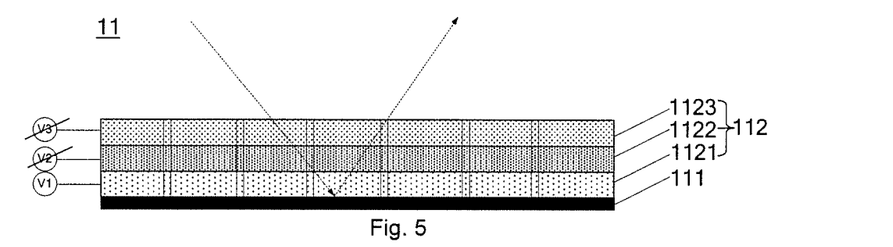
FIG. 5 is a schematic diagram illustrating reflection of a first photonic crystal layer in a controlled state according to some embodiments of the present disclosure.

As shown in FIG. 5, if the first electric driving module V1 applies a drive voltage to the first photonic crystal layer 1121, the second electric driving module V2 does not apply a drive voltage to the second photonic crystal layer 1122, and the third electric driving module V3 does not apply a drive voltage to the third photonic crystal layer 1123, then the first photonic crystal layer 1121 reflects red light in a controlled state, and the second photonic crystal layer 1122 and the third photonic crystal layer 1123 allow light to pass through and do not reflect colors. In this case, the color of the reflected light is red visually.

Figure 6:
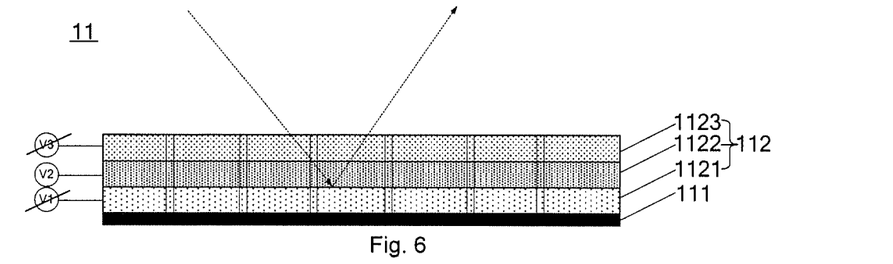
FIG. 6 is a schematic diagram illustrating reflection of a second photonic crystal layer in a controlled state according to some embodiments of the present disclosure.

As shown in FIG. 6, if the second electric driving module V2 applies a drive voltage to the second photonic crystal layer 1122, the first electric driving module V1 does not apply a drive voltage to the first photonic crystal layer 1121, and the third electric driving module V3 does not apply a drive voltage to the third photonic crystal layer 1123, then the second photonic crystal layer 1122 reflects green light in a controlled state, and the first photonic crystal layer 1121 and the third photonic crystal layer 1123 allow light to pass through and do not reflect colors. In this case, the color of the reflected light is green visually.

Figure 7:
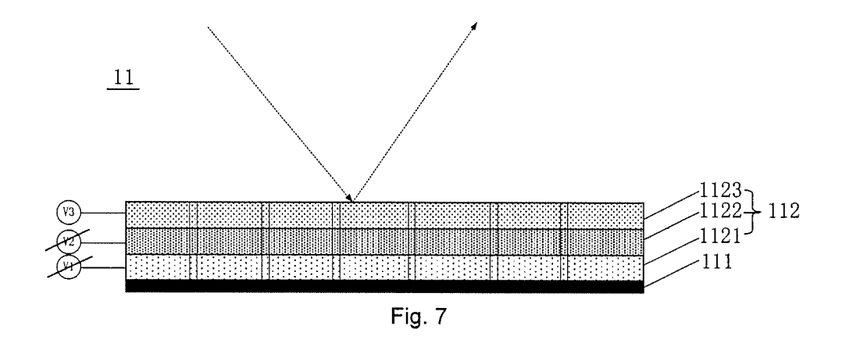
FIG. 7 is a schematic diagram illustrating reflection of a third photonic crystal layer in a controlled state according to some embodiments of the present disclosure.

As shown in FIG. 7, if the third electric driving module V3 applies a drive voltage to the third photonic crystal layer 1123, the first electric driving module V1 does not apply a drive voltage to the first photonic crystal layer 1121, and the second electric driving module V2 does not apply a drive voltage to the second photonic crystal layer 1122, then the third photonic crystal layer 1123 reflects blue light in a controlled state, and the first photonic crystal layer 1121 and the second photonic crystal layer 1122 allow light to pass through and do not reflect colors. In this case, the color of the reflected light is blue visually.

Figure 8:
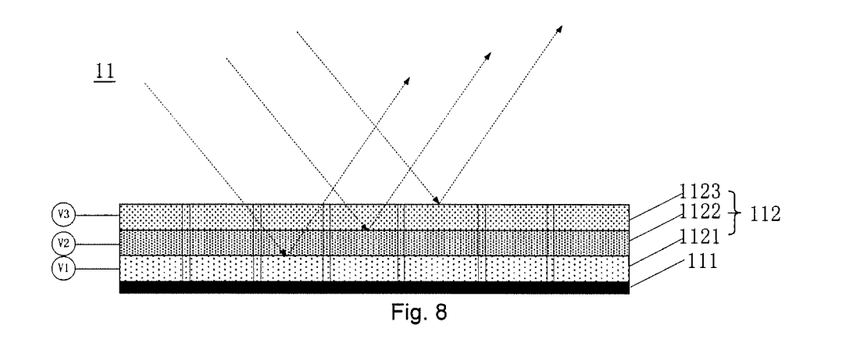
FIG. 8 is a schematic diagram of reflection when different pixels disposed in three photonic crystal layers are controlled separately according to some embodiments of the present disclosure.

As shown in FIG. 8, if the first electric driving module V1 applies a drive voltage to the first photonic crystal layer 1121, the second electric driving module V2 applies a drive voltage to the second photonic crystal layer 1122, and the third electric driving module V3 applies a drive voltage to the third photonic crystal layer 1123, then the first photonic crystal layer 1121 reflects red light, the second photonic crystal layer 1122 reflects green light, and the third photonic crystal layer 1123 reflects blue light. The color of the light obtained after mixing the three reflected light is white visually.

Considering that the above description on how to realize layered reflection control of the photonic crystal layers ignores the process of controlling the reflected light reflected by different portions of each photonic crystal layer, the structure of the electric driving module corresponding to each photonic crystal layer is given below to illustrate the process of controlling the reflected light reflected by different portions of each photonic crystal layer.

Figure 10:
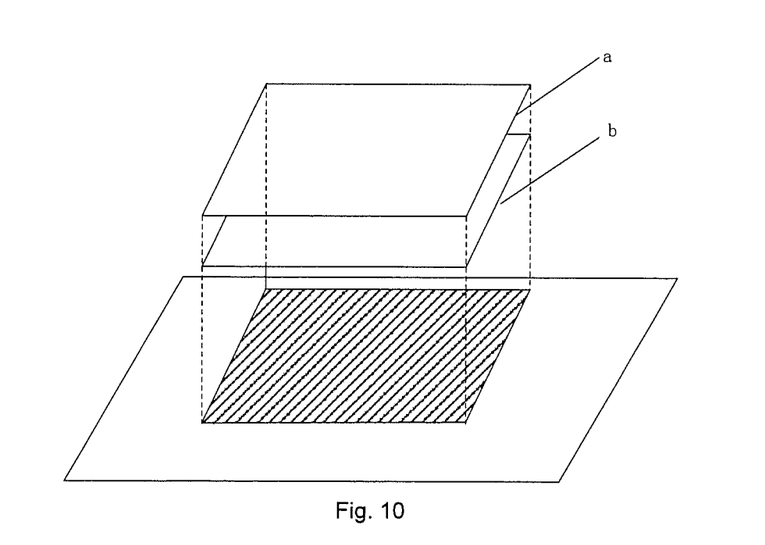
FIG. 10 is a first schematic projective diagram of each light-transmissive electrode pair according to some embodiments of the present disclosure.
Figure 11:
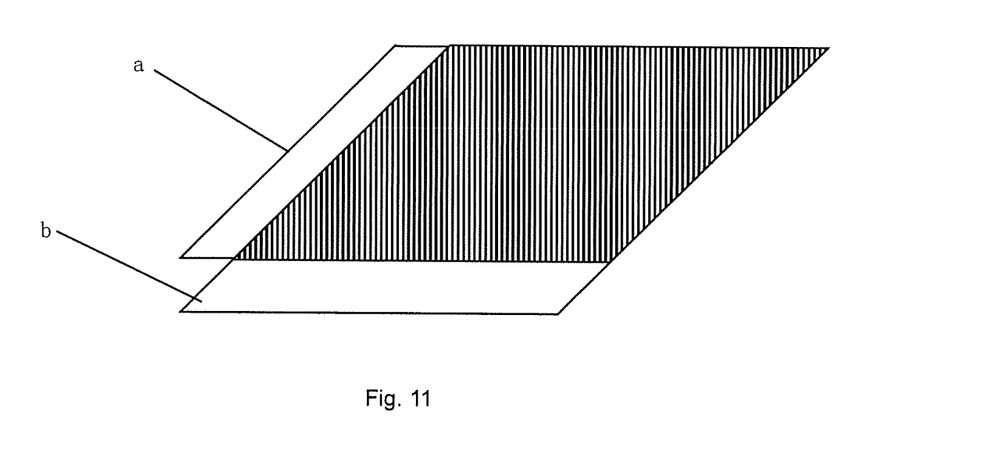
FIG. 11 is a second schematic projective diagram of each light-transmissive electrode pair according to some embodiments of the present disclosure.

As shown in FIGS. 2 and 3, the at least two electric driving modules are located above the base substrate 111, and each electric driving module includes a plurality of light-transmissive electrode pairs. As shown in FIGS. 10 and 11, each light-transmissive electrode pair includes a first light-transmissive electrode b and a second light-transmissive electrode a, in which the first light-transmissive electrode b is close to the base substrate 111 relative to the second light-transmissive electrode a. A photonic crystal layer is disposed between first light-transmissive electrodes b and second light-transmissive electrodes a in light-transmissive electrode pairs of a corresponding electric driving module, that is, the first light-transmissive electrodes b of the light-transmissive electrode pairs in the electric driving module is defined as a lower electrode module as a whole, and the second light-transmissive electrodes a of the light-transmissive electrode pairs in the electric driving module is defined as an upper electrode module as a whole, thereby the photonic crystal layer is located between the lower electrode module and the upper electrode module in the corresponding electric driving module.

From the structure of each of the above electric driving modules, it can be seen that each photonic crystal layer can be divided to into a plurality of portions according to the plurality of light-transmissive electrode pairs in a corresponding electric driving module, and the plurality of portions are in one-to-one correspondence to the plurality of light-transmissive electrode pairs. Each portion is defined as a photonic crystal unit. Thus, when a photonic crystal layer is controlled, the light-transmissive electrode pairs in the electric driving module corresponding to the photonic crystal layer may be controlled separately, such that reflectivities of different photonic crystal units in the photonic crystal layer may be adjusted separately, so as to realize zoning adjustment of light of the same color. For two photonic crystal layers, reflectivities of the photonic crystal units at different positions in the two photonic crystal layers may be adjusted separately by controlling the light-transmissive electrode pairs in the electric driving modules corresponding to the two photonic crystal layers, thus realizing zoning adjustment of light of different colors.

When the adjustable reflective device 11 shown in FIG. 2 or 3 is applied to the display device shown in FIG. 12, it is possible that due to the action of static electricity, the bottom of the light guide plate 13 has static electricity when a upper electrode module (e.g. the third upper electrode module 1133b) in the electric driving module corresponding to photonic crystal layer at the top of the adjustable reflective device 11 shown in FIG. 2 or 3 receives a drive voltage, thus affecting the light conducting performance of the light guide plate 13. To solve this problem, in some embodiments, as shown in FIG. 12, the display device further includes an interlayer insulating layer 14 disposed between the adjustable reflective device 11 and the light guide plate 13, thereby not only solving the problem of affecting the light conducting performance of the light guide plate 13 due to the static electricity at the bottom of the light guide plate 13, but also eliminating the need to reserve a distance between the adjustable reflective device 11 and the bottom of the light guide plate 13. Thus, the thickness of the backlight module is further reduced, which is conducive to the development of thin and light LCDs.

In some embodiments, as shown in FIG. 2, the adjustable reflective device 11 further includes at least one interlayer insulating layer, each of which is disposed between first light-transmissive electrodes in an electric driving module corresponding to a upper photonic crystal layer in two adjacent photonic crystal layers, and second light-transmissive electrodes in an electric driving module corresponding to the lower photonic crystal layer in the two adjacent photonic crystal layers, such that the first and second light-transmissive electrodes corresponding to the two adjacent photonic crystal layers are insulated from each other.

In some embodiments, as shown in FIG. 2, the at least two photonic crystal layers include three photonic crystal layers, and the adjustable reflective device 11 includes a base substrate 111, a first lower electrode module 1131a disposed on the base substrate 111, a first photonic crystal layer 1121 disposed on a surface of the first lower electrode module 1131a facing away from the base substrate 111, a first upper electrode module 1131b disposed on a surface of the first photonic crystal layer 1121 facing away from the first lower electrode module 1131a, a first interlayer insulation layer 1141 disposed on a surface of the first upper electrode module 1131b facing away from the first photonic crystal layer 1121, a second lower electrode module 1132a disposed on a surface of the first interlayer insulation layer 1141 facing away from the first upper electrode module 1131b, a second photonic crystal layer 1122 disposed on a surface of the second lower electrode module 1132a facing away from the first interlayer insulation layer 1141, a second upper electrode module 1132b disposed on a surface of the second photonic crystal layer 1122 facing away from the second lower electrode module 1132a, a second interlayer insulation layer 1142 disposed on a surface of the second upper electrode module 1132b facing away from the second photonic crystal layer 1122, a third lower electrode module 1133a disposed on a surface of the second interlayer insulation layer 1142 facing away from the second upper electrode module 1132b, a third photonic crystal layer 1123 disposed on a surface of the third lower electrode module 1133a facing away from the second interlayer insulation layer 1142, and a third upper electrode module 1133b disposed on a surface of the third photonic crystal layer 1123 facing away from the third lower electrode module 1133a.

However, the interlayer insulation layers and the light-transmissive electrodes will result in a large thickness of the adjustable reflective device 11. With regard to this problem, in some embodiments, as shown in FIG. 3, in two adjacent photonic crystal layers, first light-transmissive electrodes b in an electric driving module corresponding to the upper photonic crystal layer serves as second light-transmissive electrodes a in the electric driving module corresponding to the lower photonic crystal layer, so as to minimize the number of the electrodes.

In this case, in some embodiments, as shown in FIG. 3, the at least two photonic crystal layers includes three photonic crystal layers, and the adjustable reflective device 11 includes a base substrate 111, a first lower electrode module 1131a disposed on the base substrate 111, a first photonic crystal layer 1121 disposed on a surface of the first lower electrode module 1131a facing away from the base substrate 111, a second lower electrode module 1132a disposed on a surface of the first photonic crystal layer 1121 facing away from the first lower electrode module 1131a, a second photonic crystal layer 1122 disposed on a surface of the second lower electrode module 1132a facing away from the first photonic crystal layer 1121, a second upper electrode module 1132b disposed on a surface of the second photonic crystal layer 1122 facing away from the second lower electrode module 1132a, a third photonic crystal layer 1123 disposed on a surface of the second upper electrode module 1132b facing away from the second photonic crystal layer 1122, and a third upper electrode module 1133b disposed on a surface of the third photonic crystal layer 1123 facing away from the second upper electrode module 1132b.

From the above description, it can be seen that as compared with the adjustable reflective device shown in FIG. 2, the adjustable reflective device shown in FIG. 3 not only omits the first interlayer insulating layer 1141 and the second interlayer insulating layer 1142, but also removes the first upper electrode module 1131b and the third lower electrode module 1133a. In addition, the second lower electrode module 1132a can also be used as the first upper electrode module 1131b, and the second upper electrode module 1132b can also be used as the third lower electrode module 1133a, which not only decreases the overall thickness of the adjustable reflective device 11, but also lowers the complexity of wiring, thus reducing the difficulty of wiring in the backlight module.

In some embodiments, as shown in FIGS. 2-9, in each electric driving module, the light-transmissive electrode pairs are arranged in a pixelized manner. In this way, photonic crystal units in different portions of different photonic crystal layers can be controlled to reflect light of set colors in a pixelized manner, so that the colors of the reflected light appear in a pixelized arrangement. Thereby after the light is emitted from the backlight module via the light guide plate 13, it can be provided to the display panel 2 as color backlight. Thus the display panel 2 may realize color displaying without setting a color film substrate.

Figure 9:
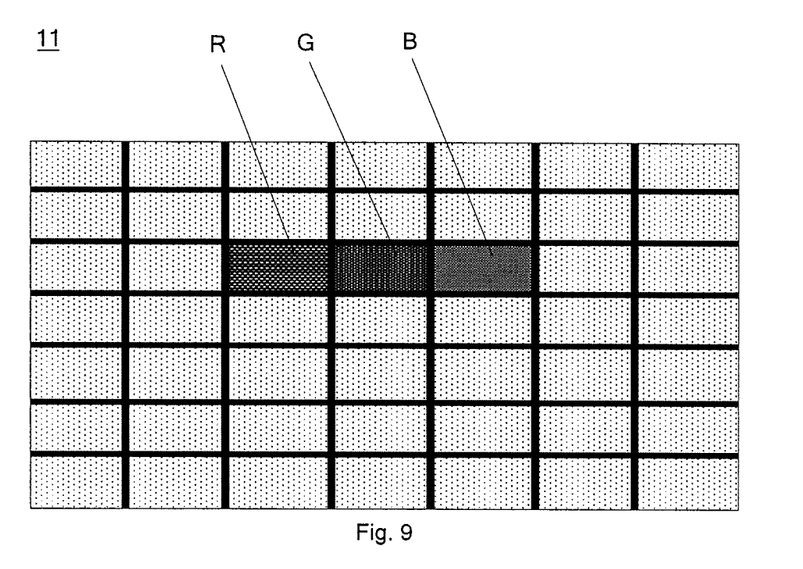
FIG. 9 is a top view of different pixels disposed in three photonic crystal layers when they are controlled separately according to some embodiments of the present disclosure.

Illustratively, FIG. 8 is a schematic diagram of reflection when different pixels disposed in three photonic crystal layers are controlled separately according to some embodiments of the present disclosure, and FIG. 9 is a top view of different pixels disposed in three photonic crystal layers when they are controlled separately, in which the first photonic crystal layer 1121 reflects red light in a controlled state, the second photonic crystal layer 1122 reflects green light in a controlled state, and the third photonic crystal layer 1123 reflects blue light in a controlled state.

The light-transmissive electrode pair in the third row and third column of the electric driving module corresponding to the first photonic crystal layer 1121 controls the reflectivity of the photonic crystal unit in the third row and third column of the first photonic crystal layer 1121, so that in the first photonic crystal layer 1121, the photonic crystal unit in the third row and third column reflects red light. In the electrical driving modules corresponding to the second photonic crystal layer 1122 and the third photonic crystal layer 1123, the light-transmissive electrode pairs in the third row and the third column do not control reflectivities of the photonic crystal units in the third row and third column of the second photonic crystal layer 1122 and the third photonic crystal layer 1123, such that in the second photonic crystal layer 1122 and the third photonic crystal layer 1123, the photonic crystal units in the third row and third column do not reflect light, that is, visible light. Therefore, the pixel in the third row and the third column is a red pixel R.

The light-transmissive electrode pair in the third row and fourth column of the electric driving module corresponding to the second photonic crystal layer 1122 controls the reflectivity of the photonic crystal unit in the third row and fourth column of the second photonic crystal layer 1122, so that in the second photonic crystal layer 1122, the photonic crystal unit in the third row and fourth column reflects green light. In the electrical driving modules corresponding to the first photonic crystal layer 1121 and the third photonic crystal layer 1123, the light-transmissive electrode pairs in the third row and the fourth column do not control reflectivities of the photonic crystal units in the third row and fourth column of the first photonic crystal layer 1121 and the third photonic crystal layer 1123, such that in the first photonic crystal layer 1121 and the third photonic crystal layer 1123, the photonic crystal units in the third row and fourth column do not reflect light, that is, visible light. Therefore, the pixel in the third row and the fourth column is a green sub-pixel G.

The light-transmissive electrode pair in the third row and fifth column of the electric driving module corresponding to the third photonic crystal layer 1123 controls the reflectivity of the photonic crystal unit in the third row and fifth column of the third photonic crystal layer 1123, so that in the third photonic crystal layer 1123, the photonic crystal unit in the third row and fifth column reflects blue light. In the electrical driving modules corresponding to the first photonic crystal layer 1121 and the second photonic crystal layer 1122, the light-transmissive electrode pairs in the third row and the fifth column do not control reflectivities of the photonic crystal units in the third row and fifth column of the first photonic crystal layer 1121 and the second photonic crystal layer 1122, such that in the first photonic crystal layer 1121 and the second photonic crystal layer 1122, the photonic crystal units in the third row and fifth column do not reflect light, that is, visible light. Therefore, the pixel in the third row and the fifth column is a blue sub-pixel B.

From the above analysis, it can be seen that by controlling the reflection of light from the photonic crystal units of different photonic crystal layers at different pixel positions, the light entering the adjustable reflective device 11 from the light guide plate 13 shown in FIG. 12 is color-pixelized, that is, in the case that the light source 10 configured for the light guide plate 13 shown in FIG. 12 is a white light source 10, the adjustable reflective device 11 is for example used to realize color pixelization of the backlight. In addition, by controlling the drive voltages received by different photonic crystal units, the intensities of the light reflected by different photonic crystal units may be different, thus realizing dynamic adjustment of the pixelized light.

For example, as shown in FIG. 10, for the second light-transmissive electrode a and the first light-transmissive electrode b of a light-transmissive electrode pair, when the reflectivity of the corresponding photonic crystal layer is adjusted, it is necessary to make the second light-transmissive electrode a and the first light-transmissive electrode b simultaneously act on the portion of the photonic crystal layer requiring adjustment of the reflectivity. Based on this, in some embodiments, orthographic projections of the first light-transmissive electrode b and the second light-transmissive electrode a in each of the light-transmissive electrode pairs on the base substrate 111 coincide with each other. At this time, the second light-transmissive electrode a and the first light-transmissive electrode b need to be located in a light-transmissive region of a corresponding sub-pixel to ensure that all the reflected light are emitted from the light guide plate 13 after reflection and are emitted to the display panel to make a corresponding pixel display.

As shown in FIG. 11, orthographic projections of the first light-transmissive electrode b and the second light-transmissive electrode a in each of the light-transmissive electrode pairs on the base substrate 111 have an overlapping region. A portion of the first light-transmissive electrode b and a portion of the second light-transmissive electrode a corresponding to the overlapping region may adjust reflectivities of a portion of the photonic crystal layer corresponding to this overlapping region. Therefore, this overlapping region needs to be located in the light-transmissive region of the corresponding sub-pixel, to ensure that the portion of the photonic crystal layer corresponding to the overlapping region may reflect the light to the light guide plate 13, and the light is then emitted from the light guide plate 13 to the display panel to make a corresponding pixel display.

Considering that the portion of the photonic crystal layer corresponding to the overlapping region reflects light in the controlled state, and a portion of the photonic crystal layer corresponding to the non-overlapping region does not reflect light in the controlled state, the portion of the photonic crystal layer corresponding to the non-overlapping region presents a black state when the base substrate 111 is a black base substrate 111. In the case where the portion of the photonic crystal layer corresponding to the overlapping region reflects light in the controlled state, to prevent black state of the portion of the photonic crystal layer corresponding to the non-overlapping region from causing interference to the reflected light, in some embodiments, the non-overlapping region is corresponding to the non-transmissive region of the sub-pixel.

As shown in FIG. 12, the display device is any product or component having a display function such as a mobile phone, a tablet computer, a television set, a display, a notebook computer, a digital photo frame or a navigator.

Figure 13:
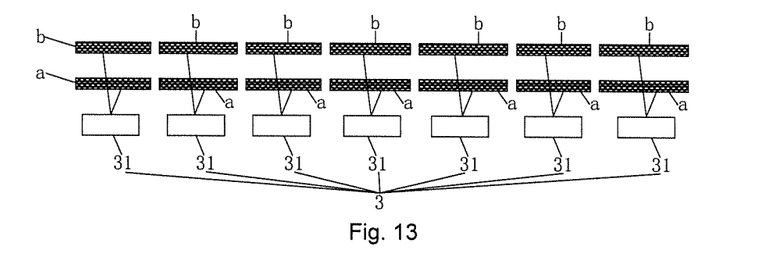
FIG. 13 is a schematic diagram showing connections between light-transmissive electrodes and voltage regulators in a display device according to some embodiments of the present disclosure.

In the case where each electric driving module included in the adjustment assembly 113 of the adjustable reflective device 11 includes a plurality of light-transmissive electrode pairs, in some embodiments, as shown in FIG. 13, the display device further includes at least two voltage adjusting units 3 that are in one-to-one correspondence with the at least two electric driving modules. Each voltage adjusting unit 3 includes a plurality of voltage regulators 31 that are in one-to-one correspondence with the plurality of light-transmissive electrode pairs, and each voltage regulator 31 is connected to a corresponding light-transmissive electrode pair, such that each light-transmissive electrode pair may adjust the reflectivity of a corresponding photonic crystal unit independently. In some embodiments, the function of the voltage regulators 31 is achieved by one and more circuits.

Figure 14:
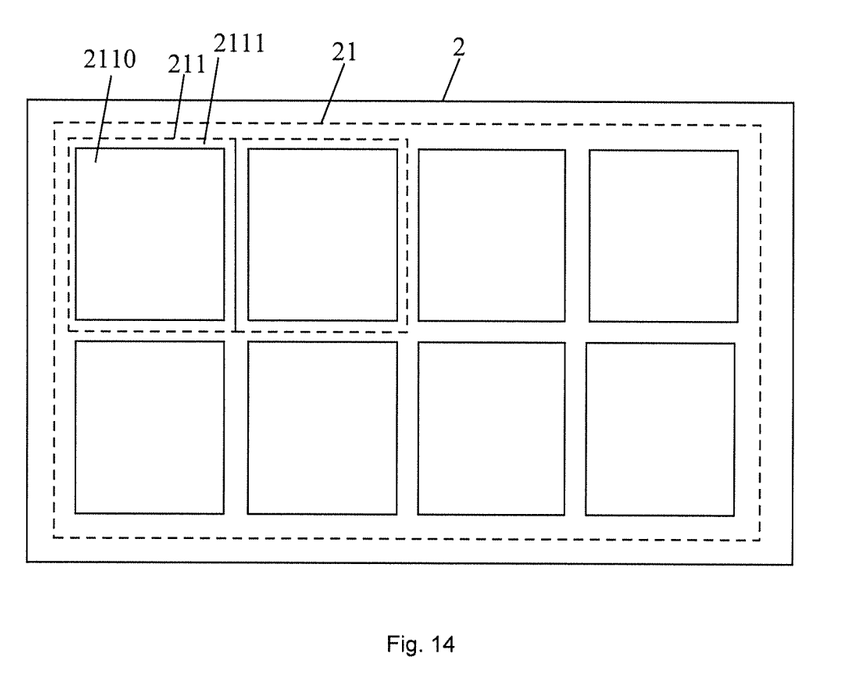
FIG. 14 is a display panel in a display device according to some embodiments of the present disclosure.

It will be known that as shown in FIG. 14, the display region 21 of the display panel includes a plurality of sub-pixels 211, and each sub-pixel 211 includes a light-transmissive region 2110 and a non-transmissive region 2111. At this time, as shown in FIG. 10, orthographic projections of a first light-transmissive electrode b and a second light-transmissive electrode a in each of the light-transmissive electrode pairs on the base substrate 111 coincide with each other, and light-transmissive regions of the sub-pixels are in one-to-one correspondence with the light-transmissive electrode pairs. In addition, a light-transmissive region of each sub-pixel coincides with an orthographic projection of a first light-transmissive electrode b included in a corresponding light-transmissive electrode pair on the base substrate 111. Alternatively, as shown in FIG. 11, orthographic projections of the first light-transmissive electrode b and the second light-transmissive electrode a in each of the light-transmissive electrode pairs on the base substrate 111 have an overlapping region. Light-transmissive regions of the sub-pixels are in one-to-one correspondence with the light-transmissive electrode pairs, and an orthographic projection of a light-transmissive region of each of the sub-pixels on the base substrate 111 coincides with an overlapping region between orthographic projections of a first light-transmissive electrode b and a second light-transmissive electrode a in a corresponding light-transmissive electrode pair on the base substrate 111.

In the description of the above embodiments, specific features, structures, materials or features may be combined in an appropriate manner in any one or more embodiments or examples.

The above description is merely some embodiments of the present disclosure, but the protection scope of the present disclosure is not limited thereto. Any person skilled in the art could readily conceive of changes or replacement within the technical scope of the present disclosure, which should all be included in the protection scope of the present disclosure. Therefore, the protection scope of the present disclosure should be determined by the protection scope of the claims.

What is claimed is:

1. An adjustable reflective device, comprising:
a base substrate;
a reflective film disposed above the base substrate; and
an adjustment assembly configured to control reflectivities of different portions of the reflective film, wherein
the reflective film comprises at least two photonic crystal layers and each photonic crystal layer is stacked with the base substrate; and a plurality of through holes is provided in each of portions of each photonic crystal layer, and the photonic crystal layer includes a plurality of charged media in each of the plurality of through holes; and
the adjustment assembly comprises at least two electric driving modules that are in one-to-one correspondence with the at least two photonic crystal layers, and each electric driving module is configured to provide drive voltages to a corresponding photonic crystal layer of the at least two photonic crystal layers, so that reflectivities of different portions of the corresponding photonic crystal layer are adjustable under the drive voltages, wherein
each of charges carried by the charged media has an opposite polarity with the drive voltages; and the at least two photonic crystal layers are configured to allow light to pass through in an uncontrolled state, the at least two photonic crystal layers are configured to reflect light of different colors in a controlled state, and light obtained after mixing light reflected by the at least two photonic crystal layers in the controlled state is white light.

2. The adjustable reflective device according to claim 1, wherein the base substrate is a black base substrate.

3. The adjustable reflective device according to claim 1, wherein the at least two photonic crystal layers comprises a first photonic crystal layer, a second photonic crystal layer, and a third photonic crystal layer;
the first photonic crystal layer is configured to reflect light of a first primary color in a controlled state, the second photonic crystal layer is configured to reflect light of a second primary color in a controlled state, and the third photonic crystal layer is configured to reflect light of a third primary color in a controlled state.

4. The adjustable reflective device according to claim 3, wherein the light of the first primary color is red light, the light of the second primary color is green light, and the light of the third primary color is blue light; or
the light of the first primary color is cyan light, the light of the second primary color is magenta light, and the light of the third primary color is yellow light.

5. The adjustable reflective device according to claim 1, wherein a thickness of each of the at least two photonic crystal layers ranges from 4 µm to 6 µm.

6. The adjustable reflective device according to claim 1, wherein each electric driving module comprises a plurality of light-transmissive electrode pairs, and each light-transmissive electrode pair comprises a first light-transmissive electrode and a second light-transmissive electrode;
one of the at least two photonic crystal layers is disposed between first light-transmissive electrodes and second light-transmissive electrodes in light-transmissive electrode pairs of a corresponding electric driving module.

7. The adjustable reflective device according to claim 6, wherein in two adjacent photonic crystal layers of the reflective film, first light-transmissive electrodes in an electric driving module corresponding to a photonic crystal layer disposed away from the base substrate serves as second light-transmissive electrodes in an electric driving module corresponding to a photonic crystal layer disposed close to the base substrate.

8. The adjustable reflective device according to claim 6, further comprising at least one interlayer insulating layer each of which is disposed between first light-transmissive electrodes in an electric driving module corresponding to a photonic crystal layer, which is disposed away from the base substrate, in two adjacent photonic crystal layers of the reflective film, and second light-transmissive electrodes in an electric driving module corresponding to a photonic crystal layer, which is disposed close to the base substrate, in the two adjacent photonic crystal layers.

9. The adjustable reflective device according to claim 6, wherein the plurality of light-transmissive electrode pairs are arranged in a pixelated manner.

10. The adjustable reflective device according to claim 6, wherein orthographic projections of a first light-transmissive electrode and a second light-transmissive electrode in each of the plurality of light-transmissive electrode pairs on the base substrate coincide with each other, or
orthographic projections of the first light-transmissive electrode and the second light-transmissive electrode in each of the plurality of light-transmissive electrode pairs on the base substrate have an overlapping region.

11. A backlight module, comprising the adjustable reflective device according to claim 1.

12. A display device, comprising the backlight module according to claim 11.

13. A display device comprising a backlight module, wherein the backlight module includes the adjustable reflective device according to claim 6, and
the display device further comprises at least two voltage adjusting units that are in one-to-one correspondence with the at least two electric driving modules, each voltage adjusting unit comprises a plurality of voltage regulators that are in one-to-one correspondence with the plurality of light-transmissive electrode pairs, and each voltage regulator is connected to a corresponding light-transmissive electrode pair.

14. The display device according to claim 13, further comprising a display panel,
wherein a display region of the display panel comprises a plurality of sub-pixels;
orthographic projections of a first light-transmissive electrode and a second light-transmissive electrode in each of the plurality of light-transmissive electrode pairs on the base substrate overlap, light-tramissive regions of the plurality of sub-pixels are in one-to-one correspondence with the plurality of light-transmissive electrode pairs, and an orthographic projection of a light-transmissive region of each of the plurality sub-pixels on the base substrate coincides with an orthographic projection of a first light-transmissive electrode included in a corresponding light-transmissive electrode pair on the base substrate; or orthographic projections of the first light-transmissive electrode and the second light-transmissive electrode in each of the light-transmissive electrode pairs on the base substrate have an overlapping region, light-transmissive regions of the plurality of sub-pixels are in one-to-one correspondence with the plurality of light-transmissive electrode pairs, and an orthographic projection of a light-transmissive region of each of the sub-pixels on the base substrate coincides with an overlapping region between orthographic projections of a first light-transmissive electrode and a second light-transmissive electrode in a corresponding light-transmissive electrode pair on the base substrate.

* * * * *